US006049902A

United States Patent [19]
Davis et al.

[11] Patent Number: 6,049,902
[45] Date of Patent: *Apr. 11, 2000

[54] METHOD AND SYSTEM IN A DATA COMMUNICATIONS SYSTEM FOR THE ESTABLISHMENT OF MULTIPLE, RELATED DATA LINKS AND THE UTILIZATION OF ONE DATA LINK FOR RECOVERY OF ERRORS DETECTED ON ANOTHER LINK

[75] Inventors: Gordon Taylor Davis; Jeffrey Haskell Derby, both of Chapel Hill, N.C.

[73] Assignee: International Business Machines Corporation, Armonk, N.Y.

[*] Notice: This patent is subject to a terminal disclaimer.

[21] Appl. No.: 08/979,044

[22] Filed: Nov. 26, 1997

[51] Int. Cl.[7] .............................. H04L 1/18; G08C 25/02; H03M 13/00
[52] U.S. Cl. .......................... 714/748; 714/776; 370/473
[58] Field of Search ...................................... 714/748, 749, 714/750, 49, 715, 776; 178/23 A, 69 R; 370/506, 473; 375/354, 285; 395/182.02, 185.09

[56] References Cited

U.S. PATENT DOCUMENTS

| | | | |
|---|---|---|---|
| 3,879,577 | 4/1975 | Progler | 178/23 A |
| 3,956,589 | 5/1976 | Weathers et al. | 370/96 |
| 4,390,989 | 6/1983 | Perhson | 714/715 |
| 4,622,682 | 11/1986 | Kumakura | 375/285 |
| 4,633,473 | 12/1986 | Ratchford et al. | 371/68 |
| 5,345,437 | 9/1994 | Ogawa | 370/228 |
| 5,426,643 | 6/1995 | Smolinske | 370/506 |
| 5,457,701 | 10/1995 | Wasilewski et al. | 714/776 |
| 5,483,545 | 1/1996 | Darmon et al. | 714/748 |
| 5,485,465 | 1/1996 | Liu et al. | 714/4 |
| 5,485,576 | 1/1996 | Fee et al. | 714/56 |
| 5,594,490 | 1/1997 | Dawson et al. | 348/6 |

*Primary Examiner*—Emmanuel L. Moise
*Attorney, Agent, or Firm*—John D. Flynn

[57] ABSTRACT

A method and system in a data communications system are disclosed for the establishment of multiple, related data links and the utilization of one of the data links for error correction of transmission errors occurring on the other data link. A first data link is established between a first computer system and a second computer system. In response to the establishment of the first data link, a second, related data link is established between the first and second computer systems. A plurality of data packets are transmitted from the first computer system to the second computer system utilizing the first data link. A determination is made whether each of the plurality of data packets is received correctly. In response to each determination that one of the plurality of data packets is not received correctly, the second computer system transmits a selective rejection packet for the one of the plurality of data packets to the first computer system utilizing the second data link.

14 Claims, 5 Drawing Sheets

METHOD AND SYSTEM IN A DATA COMMUNICATIONS SYSTEM FOR THE ESTABLISHMENT OF MULTIPLE, RELATED DATA LINKS AND THE UTILIZATION OF ONE DATA LINK FOR RECOVERY OF ERRORS DETECTED ON ANOTHER LINK

CROSS-REFERENCE TO RELATED APPLICATIONS

The present invention is related to the subject matter of copending patent application Ser. No. 08/979,668 assigned to the assignee herein named and filed on the same date.

BACKGROUND OF THE INVENTION

1. Technical Field

The present invention relates to data communications systems and, in particular, to the establishment of multiple related communication data links between two computer systems and the utilization of one data link for error correction. Still more particularly, the present invention relates to a method and system in a data communications system for the transmission of data packets utilizing a first data link and the transmission of selective rejection packets and their associated retransmissions of data packets utilizing a second, related data link.

2. Description of the Related Art

Computer systems utilize modems to communicate with each other utilizing analog telecommunication lines such as a telephone network. The modem converts the digital data from the computer to an analog signal that can be transmitted on a telecommunication line, and converts the analog signal received to data for the computer. Standard protocols are defined, such as the ITU V series, which describe modem operation and design in order to permit different, conforming computer systems to communicate.

One such protocol is an error detection and recovery via retransmission protocol, such as the ITU V.42 protocol. Such a protocol recovers from errors by retransmitting incorrectly received data packets. Error correction protocols are defined to overcome data communication errors typically due to noise on the telecommunication line. The protocol defines procedures to be taken when a transmitted packet of data is received in error.

For example, when a receiving system receives a packet in error, a standard reject procedure (REJ) requires the retransmission of all data received after the bad packet was received. Alternatively, a selective reject procedure (SREJ) requires retransmission of only the packets which were actually received in error, thus minimizing the total amount of data which must be retransmitted after an error has occurred.

Using a selective reject instead of a standard reject procedure may speed up transmission. However, problems can occur when the packet including the selective reject information is itself in error. For example, the selective reject packet may be lost during transmission. In this case, the data link must wait for a time-out recovery. This wait may have a larger negative impact on throughput than if a standard reject procedure had been used, since all data sent while waiting for the time-out will be discarded during the process of recovering from that time-out.

Therefore a need exists for a method and system in a data communications system such that data packets may continue to be transmitted although errors may occur during the transmission of selective rejection packets.

SUMMARY OF THE INVENTION

It is therefore one object of the present invention to provide an improved data processing system.

It is another object of the present invention to provide a method and system in a data communications system for the establishment of multiple, related data links between two computer systems, and the utilization of one data link for error correction.

It is yet another object of the present invention to provide a method and system in a data communications system for the transmission of data packets utilizing a first data link, and the transmission of selective rejection packets and their associated retransmissions of data packets utilizing a second, related data link.

The foregoing objects are achieved as is now described. A method and system in a data processing system are disclosed for the establishment of multiple, related data links, and the utilization of one of the data links for error correction of data sent on the other data link. A first data link is established between a first computer system and a second computer system. In response to the establishment of the first data link, a second, related data link is established between the first and second computer systems. A plurality of data packets are transmitted from the first computer system to the second computer system utilizing the first data link. A determination is made whether each of the plurality of data packets is received correctly. In response to each determination that one of the plurality of data packets is not received correctly, the second computer system transmits a selective rejection packet for the one of the plurality of data packets to the first computer system utilizing the second data link.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of the preferred embodiment when read in conjunction with the accompanying drawings, wherein:

DETAILED DESCRIPTION OF PREFERRED EMBODIMENT

An exemplary embodiment of the present invention and its advantages are better understood by referring to FIGS.

1–6 of the drawings, like numerals being used for like and corresponding parts of the accompanying drawings.

Figure 1:
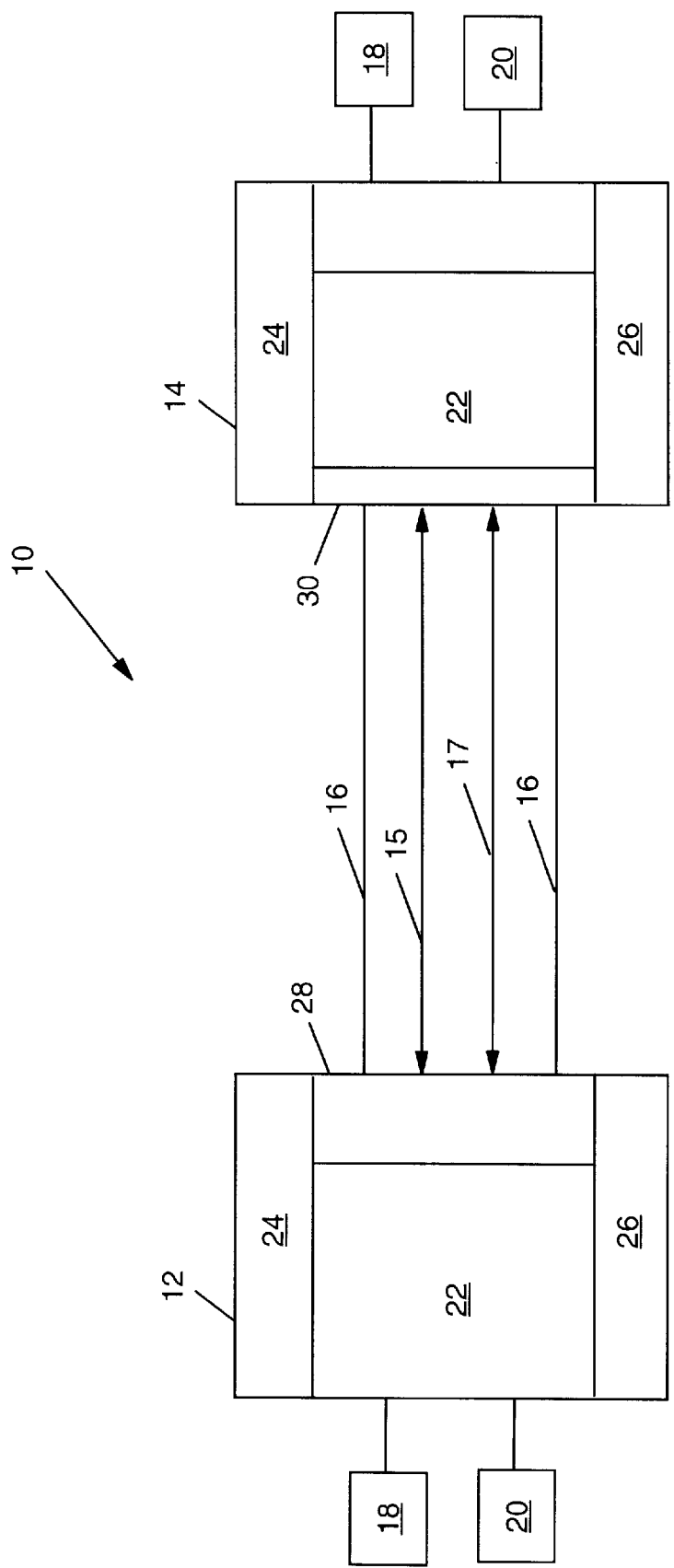
FIG. 1 depicts a high-level block diagram of a data communications system 10 including a first computer system and a second computer system which may be utilized to implement the method and system of the present invention.

FIG. 1 depicts a high-level block diagram of a data communications system 10 including a first computer system 12 and a second computer system 14 which may be utilized to implement the method and system of the present invention. In a preferred embodiment, data communications system 10 may include a plurality of computer systems 12, 14 which may be linked together utilizing a physical communication link 16. Those skilled in the art will recognize that any number of computer systems may be interconnected to permit data communication.

Physical communication link 16 includes a plurality of logical data links, or logical channels, such as data links 15 and 17. A data link includes the physical communication link as well as the protocol and any associated software necessary to implement the data link. Data links 15 and 17 are related but have separate, different logical addresses so that packets may be transmitted on one data link without interfering with packets being concurrently transmitted on the other data link. Those skilled in the art will recognize that data links 15, 17 may be implemented utilizing two different physical links.

As is common in such data processing systems, each individual computer may be coupled to a storage device 18 and/or a printer/output device 20. One or more such storage devices may be utilized to store the various data objects or multimedia files which may be periodically accessed, processed, and presented within data communications system 10 in accordance with the method and system of the present invention. In a manner well known in the prior art, each such data processing document or multimedia file may be stored within a storage device which may be associated with a resource manager or library service, which is responsible for maintaining and updating all resource objects associated therewith.

Each computer system 12, 14 may be implemented utilizing any suitably configured personal computer, mini computer, mainframe computer, or a computer running in a distributed network of other computers. Each computer system 12, 14 has associated therewith a CPU 22, a computer display 24 and keyboard 26. In order to permit communication between first and second computer systems 12 and 14, modems 28 and 30 are included in computer systems 12 and 14, respectively. Modems 28, 30 may be implemented utilizing voice-band modems, digital communications, such as ISDN, analog or packet cellular, satellite, or any other suitable communications device.

The present invention permits data transmission to continue on first data link 15 uninterrupted while selective rejection error correction procedures and the necessary retransmissions of data continue on second data link 17. In a preferred embodiment, computer systems 12, 14 transmit data in accordance with the ITU V.42 protocol. A more complete description of the V.42 standard may be found in *Error Correcting Procedures for DCEs Using Asynchronous to Synchronous Conversion*, Recommendation V.42, International Telecommunications Union ITU-T, Telecommunications Standardization Sector, 1988, which is incorporated herein by reference.

Data links 15 and 17 are different logical channels which may reside either on the same physical connection, such as link 16 shown in FIG. 1, or on different physical connections. Data links 15 and 17 are related. They utilize the same set of sequence numbers N(S) and N(R) for tracking transmissions and receipts of packets. Therefore, all packets transmitted by a computer system on data links 15 and 17 will be numbered using one set of sequential numbers. The transmitting and receiving computer systems may easily track each packet, including data packets as well as selective rejection packets. By utilizing two separate logical channels, regular data transmissions may continue on the first data link while selective rejection procedures are processed on the second data link. In this manner, when errors occur during the processing of the selective rejection packets, it is not necessary to wait for a time-out to occur in order to recover from the error.

Figure 2:
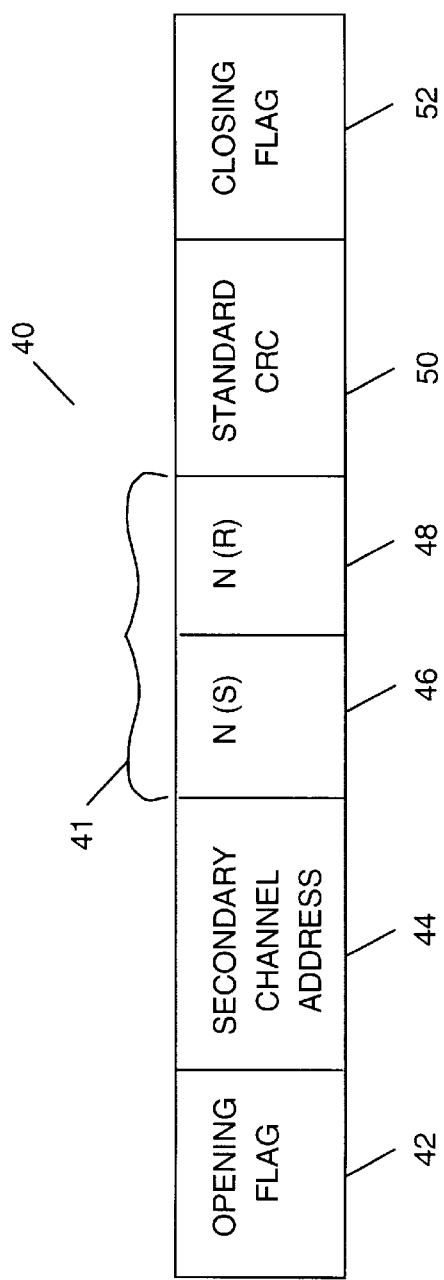
FIG. 2 illustrates a pictorial representation of a selective rejection packet format and its associated fields in accordance with the method and system of the present invention.

FIG. 2 illustrates a pictorial representation of a selective rejection packet format 40 and its associated fields in accordance with the method and system of the present invention. Format 40 includes a plurality of fields. Field 42 is a standard opening flag field. Field 44 is a standard address field. The address of the secondary logical channel, second data link 17, is inserted into field 44 for a selective reject packet. Fields 46 and 48 together comprise a control field 41. Field 46 includes a number N(S). The number N(S) is the next sequence number assigned by the transmitting computer system in the sequence of numbers. Field 48 includes a number N(R). The number N(R) is the sequence number N(S) which was associated with the packet which was determined to be received in error which caused the transmission of this selective rejection packet. Field 50 includes the standard CRC associated and transmitted with this selective reject packet. Field 52 is a standard closing flag field. Format 40 resembles a standard V.42 "I" format with a null I-field, i.e. an I-field including zero bytes of data.

Figure 3:
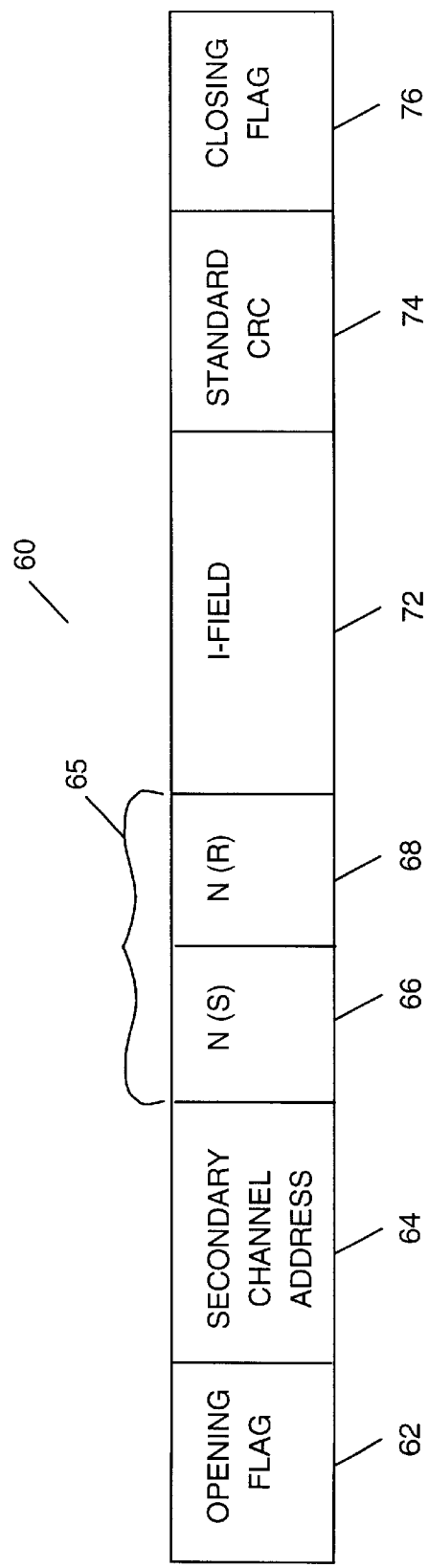
FIG. 3 depicts a pictorial representation of a retransmission packet format and its associated fields in accordance with the method and system of the present invention.

FIG. 3 depicts a pictorial representation of a retransmission packet format 60 and its associated fields in accordance with the method and system of the present invention. Format 60 includes a plurality of fields. Field 62 is a standard opening flag field. Field 64 is a standard address field. The address of the secondary logical channel, second data link 17, is inserted into field 64 for a retransmission packet. Field 65 is a control field which includes fields 66 and 68. Field 66 includes a number N(S). The number N(S) is the next sequence number assigned by the transmitting computer system in the sequence of numbers. Field 68 includes a number N(R). The number N(R) is the sequence number N(S) which was associated with the selective reject packet which indicated a need to retransmit this packet. The number N(R) provides a selective acknowledgement of the received selective reject packet with N(S) set to this number. Field 72 is an information field, I-field, which includes the data to be retransmitted which had originally been determined to have been received in error. Field 74 includes the standard CRC associated and transmitted with this retransmission packet. Field 76 is a standard closing flag field.

Figure 4:
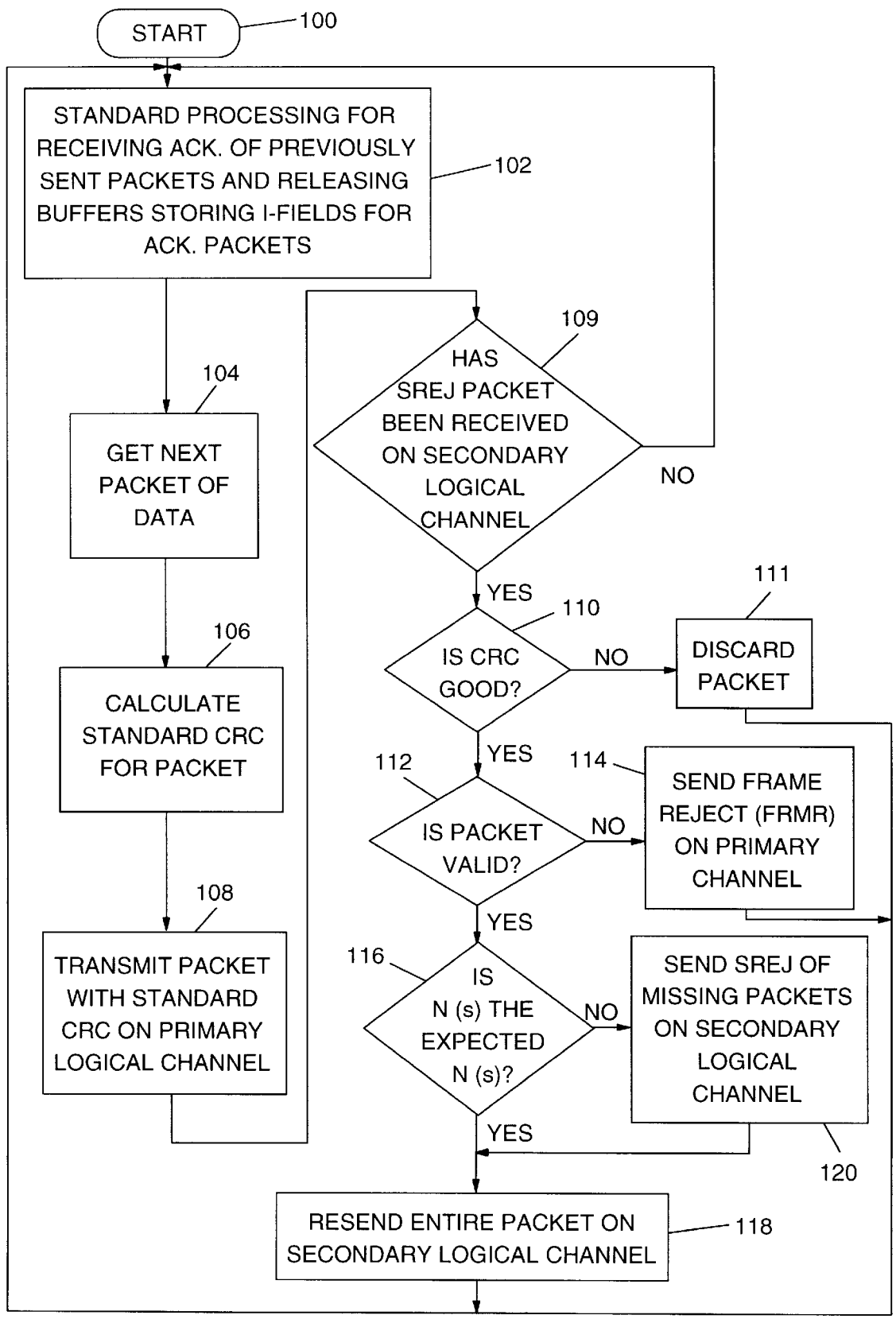
FIG. 4 illustrates a high-level flow chart depicting a file transfer source transmitting data packets utilizing a first data link, and retransmitting data packets utilizing a second data link in accordance with the method and system of the present invention.

FIG. 4 illustrates a high-level flow chart depicting a file transfer source, for example first computer system 12, transmitting data packets utilizing a first data link, data link 15, receiving selective reject packets on secondary data link 17, and retransmitting data packets utilizing a second data link, second data link 17, in accordance with the method and system of the present invention. The process starts as depicted at block 100 and thereafter passes to block 102 which illustrates permitting standard processing for receiving acknowledgements of previously sent packets and releasing buffers which are storing I-fields for acknowledged packets. Next, block 104 depicts the getting of the next packet of data to be transmitted. Block 106, thereafter, illustrates the calculation of the standard CRC for the data packet. The process then passes to block 108 which depicts the transmission of the packet along with the standard CRC on the primary logical channel, such as data link 15.

Next, block 109 illustrates a determination of whether or not a selective reject (SREJ) packet has been received by first computer system 12 on the secondary logical channel, such as data link 17. If a determination is made that a selective reject packet has not been received on the secondary logical channel, the process passes back to block 102. Referring again to block 109, if a determination is made that a selective reject packet has been received on the secondary logical channel, the process passes to block 110 which depicts a determination of whether or not CRC is good. If a determination is made that the CRC is not good, the process passes to block 111 which illustrates the discarding of the packet. The process then passes back to block 102.

Referring again to block 110, if a determination is made that the CRC is good, the process passes to block 112 which depicts a determination of whether or not the packet is valid. If a determination is made that the packet is not valid, the process passes to block 114 which illustrates the sending of a frame reject (FRMR) packet utilizing first data link 15. The process then passes back to block 102.

Referring again to block 112, if a determination is made that the packet is valid, the process passes to block 116 which illustrates a determination of whether or not the sequence number associated with the selective reject packet, N(S), is the next expected number in the sequence. If a determination is made that the number associated with the selective reject packet is the next expected number in the sequence, the process passes to block 118 which depicts the retransmission of the data packet identified by the selective reject packet as having been received in error. The process then passes back to block 102. Referring again to block 116, if a determination is made that the number associated with the selective reject packet is not the next expected number in the sequence, the process passes to block 120 which illustrates first computer system 12 sending one or more selective reject packets to second computer system 14 on second data link 17. The process then passes to block 118. A selective reject packet is sent in response to each missing sequence number so that the data packet associated with each missing sequence number may be retransmitted.

Figure 5:
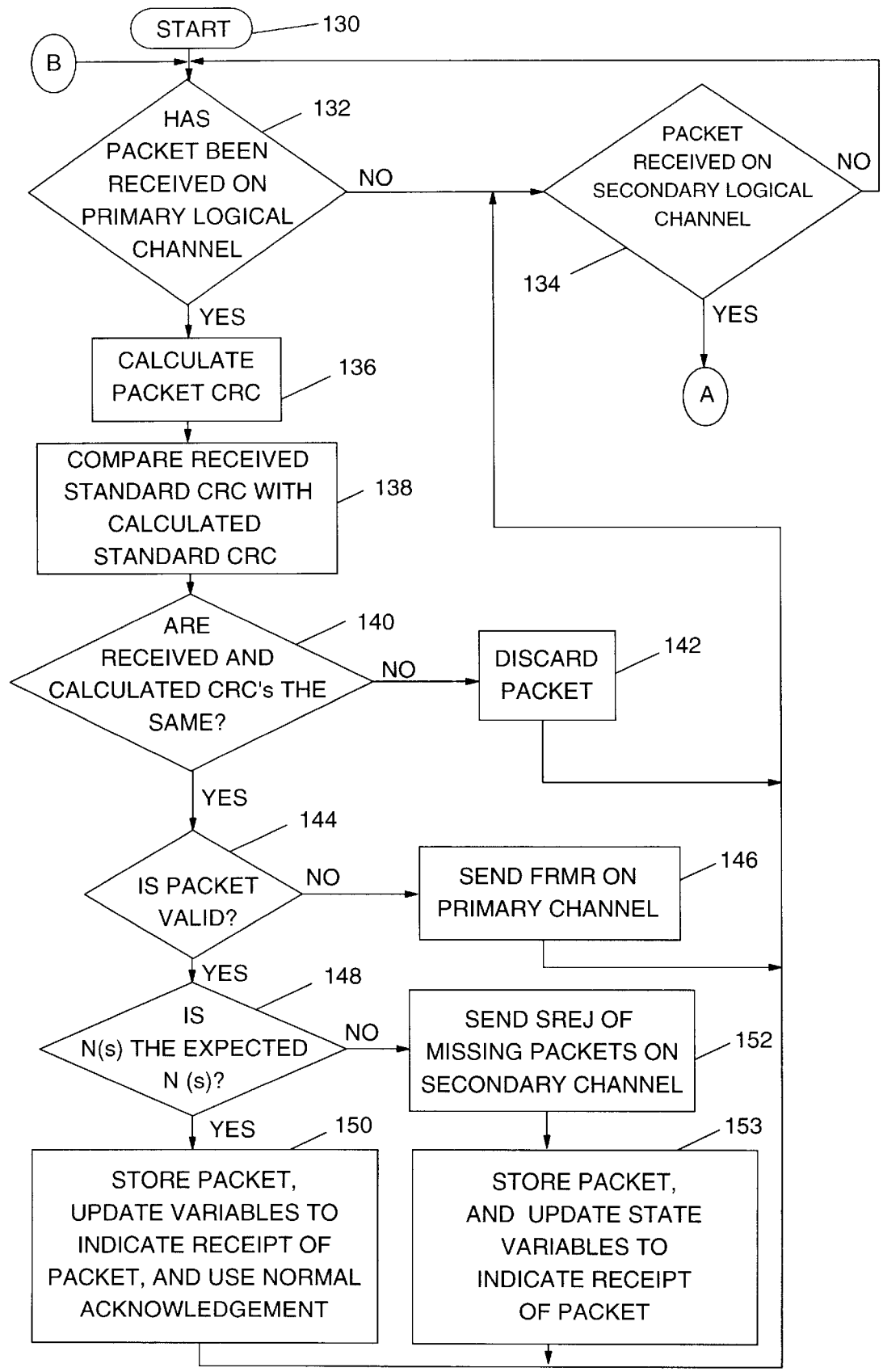
FIGS. 5 and 6 together depict a high-level flow chart illustrating a file transfer destination receiving data packets utilizing a first data link, and transmitting selective rejection packets utilizing a second data link in accordance with the method and system of the present invention.
Figure 6:
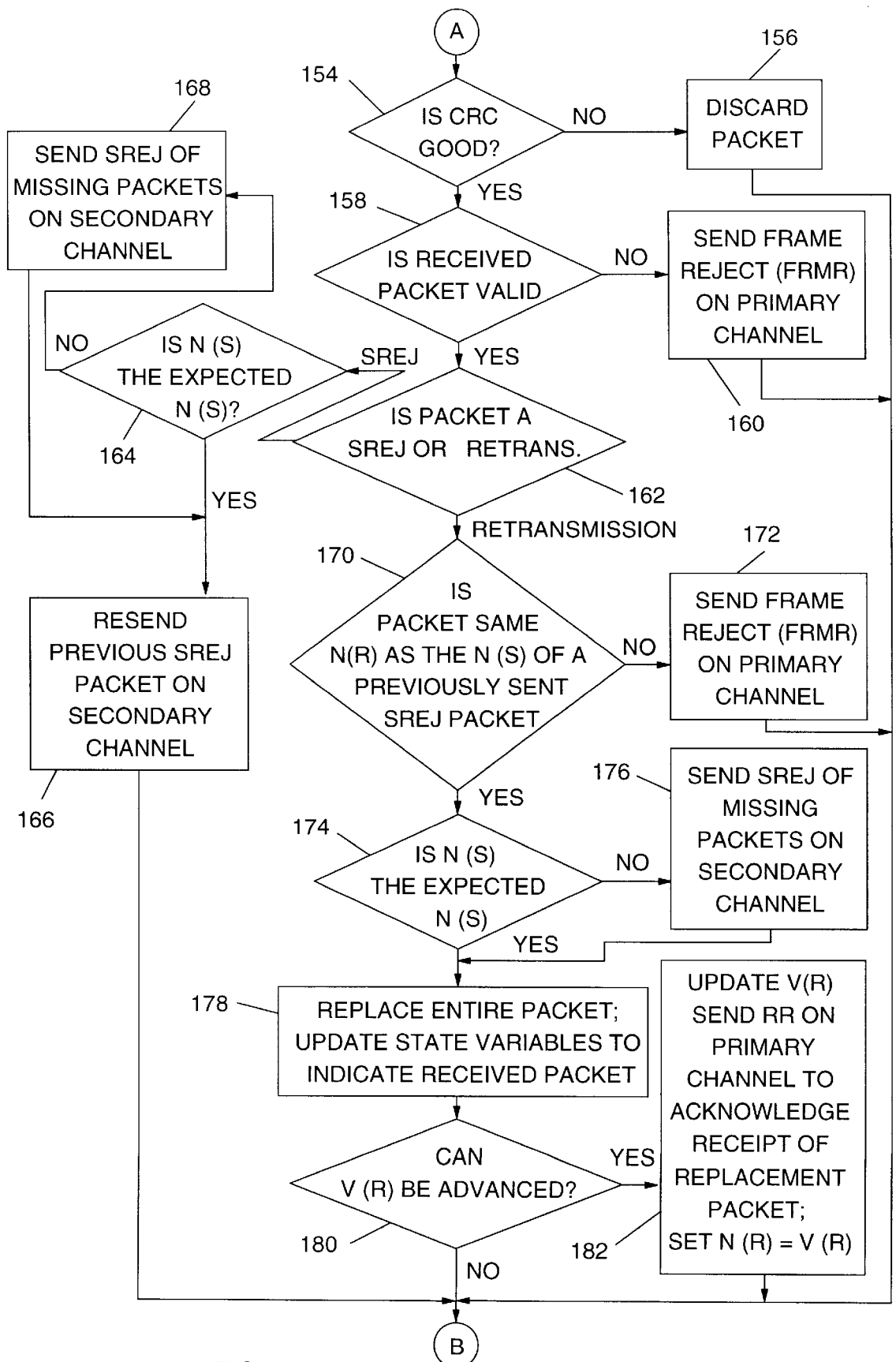

FIGS. 5 and 6 together depict a high-level flow chart illustrating a file transfer destination, such as second computer system 14, receiving data packets utilizing first data link 15, transmitting selective rejection packets utilizing second data link 17, and receiving retransmitted packets on second data link 17 in accordance with the method and system of the present invention. The process starts as depicted at block 130 and thereafter passes to block 132 which illustrates a determination of whether or not second computer system 14 has received a packet transmitted utilizing the primary logical channel, first data link 15. If a determination is made that second computer system 14 has not received a packet transmitted utilizing the primary logical channel, the process passes to block 134. Referring again to block 132, if a determination is made that second computer system 14 has received a packet transmitted utilizing the primary logical channel, the process passes to block 136 which depicts the calculation of the CRC for the received packet. Next, block 138 illustrates the comparison of the standard CRC received with the packet and the calculated standard CRC.

Next, block 140, depicts a determination of whether or not the CRCs are the same. If a determination is made that the received and the calculated CRCs are different, the process passes to block 142 which illustrates the discarding of the packet. Referring again to block 140, if a determination is made that the CRCs are the same, the process passes to block 144 which depicts a determination of whether or not the received packet is valid. If a determination is made that the received packet is invalid, the process passes to block 146 which depicts the sending of a frame reject packet (FRMR) utilizing a primary logical channel, first data link 15. The process then passes to block 134.

Referring again to block 144, if a determination is made that the received packet is valid, the process passes to block 148 which illustrates a determination of whether or not the sequence number, N(S), associated with the received packet is the next expected number in the sequence. If a determination is made that the sequence number associated with the received packet is the next expected number in the sequence, the process passes to block 150 which illustrates the storage of the packet, the updating of the variables to indicate receipt of the packet, and the usage of normal acknowledgement procedures following the ITU V.42 standard. The process then passes to block 134. Referring again to block 148, if a determination is made that the sequence number associated with the received packet is not the next expected number in the sequence, the process passes to block 152 which depicts the transmission of one or more selective reject packets utilizing the secondary channel to indicate a missing data packet. The process then passes to block 153 which illustrates the storing of the packet, and the updating of the state variables to indicate receipt of the packet. The process then passes to block 134.

Referring again to block 134, a determination of whether or not the packet was received on the secondary logical channel, second data link 17, is illustrated. If a determination is made that no packet was received on the secondary logical channel, the process passes back to block 132. Referring again to block 134, if a determination is made that a packet was received on the secondary logical channel, the process passes to block 154 as illustrated through connector A.

Block 154 illustrates a determination of whether or not the CRC associated with this packet is good. If a determination is made that the CRC is not good, the process passes to block 156 which depicts the discarding of the packet. The process then passes back to block 132 as illustrated through connector B. Referring again to block 154, if a determination is made that the CRC is good, the process passes to block 158 which depicts a determination of whether or not the received packet is valid. If a determination is made that the received packet is not valid, the process passes to block 160 which depicts the sending of a frame reject packet on the primary channel. The process then passes back to block 132 as illustrated through connector B. Referring again to block 158, if a determination is made that the packet is valid, the process passes to block 162 which illustrates a determination of whether or not the packet is a selective reject packet or a retransmission packet. If a determination is made that the packet is a selective reject packet, the process passes to block 164 which illustrates a determination of whether or not the selective reject packet has an associated N(S) number which is the next expected number, N(S), in the sequence. If a determination is made that the packet is associated with the next number in the sequence, the process passes to block 166 which depicts the resending of the previous selective reject packet on the second data link. Referring again to block 164, if a determination is made that the packet is not associated with the next number in the sequence, the process passes to block 168 which depicts the sending of one or more selective reject packets indicating the missing packets on the second data link. The process then passes to block 166.

Referring again to block 162, if a determination is made that this packet is a retransmission packet, the process passes to block 170 which depicts a determination of whether or not the packet has an associated N(R) which is the same as the N(S) of a previously sent selective reject packet. If the N(R) is not the same as any previously sent packet N(S), the process passes to block 172 which illustrates the sending of a frame reject packet on the primary data link. The process then passes to block 132 as illustrated through connector B. Referring again to block 170, if a determination is made that the packet does have an N(R) which is the same as a previously sent packet N(S), the process passes to block 174 which illustrates a determination of whether or not the number N(S) associated with the received packet is the next expected number in the sequence. If a determination is made that the number N(S) associated with the received packet is not the next expected number in the sequence, the process passes to block 176 which depicts the sending of one or more selective reject packets indicating the missing packets on the second data link. The process then passes to block 178. Referring again to block 174, if a determination is made that the number N(S) associated with the received packet is the next expected number in the sequence, the process passes to block 178 which depicts the replacement of the entire originally received data packet which had been received in error with this newly received data packet. The state variables are updated to indicate that the packet has been received. The process then passes back to block 180 which depicts a determination of whether or not the V(R) can be advanced. The number V(R) indicates the most recently received packet sequence number N(S) for which all previous packets have been successfully received. If a determination is made that the V(R) can not be advanced, the process passes back to block 132 as illustrated through connector B. Referring again to block 180, if a determination is made that the V(R) can be advanced, the process passes to block 182 which depicts the updating of the V(R), and the sending of a standard V.42 acknowledgement packet, RR, on the primary channel to acknowledge receipt of the replacement packet. The number N(R) is then set equal to V(R). The process passes back to block 132 as illustrated through connector B.

It will be understood by those skilled in the art that if both first data link 15 and second data link 17 operate in a full-duplex mode, bi-directional data transfer, each computer system 12 and 14 may simultaneously implement the actions depicted in the flow charts of FIGS. 4–6. Although use of the poll/final bit and other control formats architected for V.42 is not described, it will be understood by those skilled in the art that other similar protocols could be created manipulating these control formats which would still be within the scope of the present invention. The V.42 standard provides the basis for the preferred embodiment. The principles of the present invention could just as easily be applied to other error recovery protocols, such as MNP, ITU Q.921, Q.922, V.76, and others.

While a preferred embodiment has been particularly shown and described, it will be understood by those skilled in the art that various changes in form and detail may be made therein without departing from the spirit and scope of the present invention.

What is claimed is:

1. A method in a data communications system having a first and a second computer system for the establishment of multiple, related logical links between said first and second computer systems, and the utilization of one of said logical links for error correction of transmissions errors occurring on another of said logical links, said method comprising the steps of:

establishing a single physical communication link between said first computer system and said second computer system;

said physical communication link including a first logical link and a second logical link, said first and second logical links being logically related so that said first and second logical links utilize a single set of sequence numbers;

transmitting a plurality of data packets from said first computer system to said second computer system utilizing said first logical link;

determining if each of said plurality of data packets is received correctly; and in response to each determination that one of said plurality of data packets is not received correctly, said second computer system transmitting a selective rejection packet of said one of said plurality of data packets to said first computer system utilizing said second logical link.

2. The method according to claim 1, further comprising the steps of:

said second computer system determining that said one of said plurality of data packets was received incorrectly;

said second computer system transmitting a selective rejection packet of said one of said plurality of data packets to said first computer system utilizing said second logical link; and in response to an error occurring during said transmission of said selective rejection packet, said first and second computer systems recovering from said error without requiring retransmission of a first plurality of said plurality of data packets transmitted after said occurrence of said error.

3. The method according to claim 2 further comprising the step of said first computer system retransmitting said one of said plurality of data packets utilizing said second logical link in response to a receipt of said selective rejection.

4. The method according to claim 3 further comprising the steps of:

associating a unique one of said set of sequence numbers with each of said plurality of data packets and said selective rejection packets; and transmitting each of said plurality of data packets and said selective rejection packets with said associated one of said set of sequence numbers, wherein said first and said second logical links utilize said set of sequence numbers.

5. The method according to claim 4 further comprising the steps of:

determining if each of said transmitted selective rejection packets is received correctly; and in response to each determination that said transmitted selective rejection packet is not received correctly, said first computer system transmitting a selective rejection packet to said second computer system.

6. The method according to claim 5 wherein said step of determining if each of said plurality of data packets is received correctly further includes the step of determining if one of said plurality of data packets is received out-of-sequence utilizing said associated one of said set of sequence numbers.

7. The method according to claim 6 wherein said step of determining if said transmitted selective rejection packet is not received correctly further includes the step of determining if one of said transmitted selective rejection packets is received out-of-sequence utilizing said associated one of said set of sequence numbers.

8. A data communications system having a first and a second computer system for the establishment of multiple, related logical links between said first and second computer systems, and the utilization of one of said logical links for error correction of transmission errors occurring on another of said logical links, comprising:

means for establishing a single physical communication link between said first computer system and said second computer system;

means for said physical communication link including a first logical link and a second logical link, said first and second logical links being logically related so that said first and second logical links utilize a single set of sequence number;

means for transmitting a plurality of data packets from said first computer system to said second computer system utilizing said first logical link;

means for determining if each of said plurality of data packets is received correctly; and means responsive to each determination that one of said plurality of data packets is not received correctly, for said second computer system transmitting a selective rejection packet of said one of said plurality of data packets to said first computer system utilizing said second logical link.

9. The system according to claim 8, further comprising:

means for said second computer system transmitting a selective rejection packet of said one of said plurality of data packets to said first computer system utilizing said second logical link; and means responsive to an error occurring during said transmission of said selective rejection packet, for said first and second computer systems recovering from said error without requiring retransmission of a first plurality of said plurality of data packets transmitted after said occurrence of said error.

10. The system according to claim 9 further comprising means for said first computer system retransmitting said one of said plurality of data packets utilizing said second logical link in response to a receipt of said selective rejection.

11. The system according to claim 10 further comprising:

means for associating a unique one of said set of sequence numbers with each of said plurality of data packets and said selective rejection packets; and means for transmitting each of said plurality of data packets and said selective rejection packets with said associated one of said set of sequence numbers, wherein said first and said second logical links utilize said set of sequence numbers.

12. The system according to claim 11 further comprising:

means for determining if each of said transmitted selective rejection packets is received correctly; and means responsive to each determination that said transmitted selective rejection packet is not received correctly, for said first computer system transmitting a selective rejection packet to said second computer system.

13. The system according to claim 12 wherein said means for determining if each of said plurality of data packets is received correctly further includes means for determining if one of said plurality of data packets is received out-of-sequence utilizing said associated one of said set of sequence numbers.

14. The system according to claim 13 wherein said means for determining if said transmitted selective rejection packet is not received correctly further includes means for determining if one of said transmitted selective rejection packets is received out-of-sequence utilizing said associated one of said set of sequence numbers.

* * * * *